United States Patent
Emadzadeh et al.

(10) Patent No.: US 9,432,882 B2
(45) Date of Patent: Aug. 30, 2016

(54) SYSTEM AND METHOD FOR DEPLOYING AN RTT-BASED INDOOR POSITIONING SYSTEM

(71) Applicant: QUALCOMM Incorporated, San Diego, CA (US)

(72) Inventors: Amir Abbas Emadzadeh, Santa Clara, CA (US); Sai Pradeep Venkatraman, Santa Clara, CA (US); Weihua Gao, San Jose, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 123 days.

(21) Appl. No.: 14/092,648

(22) Filed: Nov. 27, 2013

(65) Prior Publication Data

US 2015/0146553 A1  May 28, 2015

(51) Int. Cl.
| | |
|---|---|
| H04W 28/18 | (2009.01) |
| G01S 5/02 | (2010.01) |
| H04W 24/08 | (2009.01) |
| H04W 48/20 | (2009.01) |
| H04W 64/00 | (2009.01) |
| H04W 84/18 | (2009.01) |
| G01S 5/14 | (2006.01) |

(52) U.S. Cl.
CPC ............ *H04W 28/18* (2013.01); *G01S 5/0205* (2013.01); *G01S 5/0242* (2013.01); *H04W 24/08* (2013.01); *H04W 48/20* (2013.01); *H04W 64/00* (2013.01); *G01S 5/14* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,020,439 | B2 | 3/2006 | Sinivaara et al. |
| 7,894,823 | B2 | 2/2011 | Alemany et al. |
| 2008/0125144 | A1* | 5/2008 | Ruutu et al. ................ 455/457 |
| 2009/0103503 | A1 | 4/2009 | Chhabra |
| 2010/0135178 | A1 | 6/2010 | Aggarwal et al. |
| 2011/0019999 | A1 | 1/2011 | George et al. |
| 2012/0188938 | A1 | 7/2012 | Venkatraman et al. |
| 2013/0143590 | A1 | 6/2013 | Sridhara et al. |
| 2013/0170374 | A1* | 7/2013 | Aljadeff ..................... 370/252 |
| 2013/0217413 | A1* | 8/2013 | Sanders .................. G01S 3/30 455/456.1 |
| 2013/0267242 | A1 | 10/2013 | Curticapean et al. |
| 2014/0171100 | A1* | 6/2014 | Marti .................. G01S 5/0242 455/456.1 |
| 2014/0329520 | A1 | 11/2014 | Militano et al. |

FOREIGN PATENT DOCUMENTS

WO    WO-2010069061 A1    6/2010

OTHER PUBLICATIONS

International Search Report and Written Opinion—PCT/US2014/064559—ISA/EPO—Feb. 18, 2015.

\* cited by examiner

*Primary Examiner* — Diane Lo
(74) *Attorney, Agent, or Firm* — Kilpatrick Townsend & Stockton LLP

(57) ABSTRACT

The present disclosure describes methods, systems, computer-readable media, and apparatuses for evaluating the suitability of AP signaling for RTT-based location calculation. Various evaluation methods are disclosed to enable the signaling to be tested for consistency and reliability. An AP may be analyzed by a mobile device or other communications mechanism to determine whether the AP is suitable for RTT-based location signaling. A mobile device receives multiple signals from an evaluated AP at various locations in the indoor area, and derives RTT data from the signals. The RTT data is analyzed to determine whether RTT data from the AP should be used by mobile devices in the process of calculating their location.

22 Claims, 12 Drawing Sheets

FIG. 10

OBTAIN A FIRST SET OF DISTANCE DATA REPRESENTING MULTIPLE CALCULATED DISTANCES FROM A FIRST AP IN AN INDOOR AREA, WHEREIN THE DISTANCES ARE CALCULATED BASED ON RTT INFORMATION DERIVED FROM COMMUNICATIONS WITH THE FIRST AP AT MULTIPLE LOCATIONS WITHIN THE AREA.

1002

OBTAIN A DISTANCE THRESHOLD FOR THE AREA, WHEREIN THE DISTANCE THRESHOLD IS BASED ON DIMENSIONS OF THE AREA.

1004

DETERMINE, BASED ON A COMPARISON OF THE FIRST SET OF DISTANCE DATA AND THE DISTANCE THRESHOLD, THAT A RELIABILITY CONDITION IS SATISFIED WITH RESPECT TO THE FIRST AP.

1006

IN RESPONSE TO DETERMINING THAT THE RELIABILITY CONDITION IS SATISFIED WITH RESPECT TO THE FIRST AP, IDENTIFYING THE FIRST AP FOR RTT-BASED LOCATION DETERIMINATION.

1008

SYSTEM AND METHOD FOR DEPLOYING AN RTT-BASED INDOOR POSITIONING SYSTEM

CROSS-REFERENCE TO RELATED APPLICATIONS

This application is related to U.S. patent application Ser. No. 13/753,433, filed May 16, 2013, entitled "System and Method for Choosing Suitable Access Points" which is incorporated herein by reference.

BACKGROUND

Aspects of the disclosure relate to processes for identifying APs which provide signaling that is reliable for use in calculating mobile device location based on RTT.

Determining precise locations of mobile devices has become a very important function in recent years. For mobile devices, there are countless applications that use information about device location. For example, a map application can select appropriate maps, direction, driving routes, etc., based on the current location of the mobile device. A social networking application can identify other users within the vicinity based on the location of the device. Many other examples exist.

Different techniques for obtaining a position fix for a mobile device may be appropriate under different conditions. In an outdoor environment, satellite-based approaches, e.g., Global Navigation Satellite System (GNSS) techniques may be suitable, because the mobile device may be able to receive satellite-based positioning signals with specific timing requirements. Based on reception of such satellites signals, a position fix for the mobile device may be calculated. However, satellite-based approaches may not be suitable in indoor environments, because satellite signals are sometimes not strong enough to be received indoors.

In indoor environments, such as a shopping mall, airport, sports arena, etc., access point (AP)-based approaches are generally more useful for obtaining a location fix for a mobile device. The mobile device derives information based on signals sent to and received from APs. Different types of information may be obtained such as Received Signal Strength Indication (RSSI) and RTT. Such observations allow the mobile device to estimate its distance to each AP. The mobile device can then triangulate and estimate its own location, based the distances to different APs.

With the proliferation of wireless local area networks, there are often many APs (e.g., 500 APs) operating at any given moment within particular indoor environments. However, in general, calculating location based on RTT and RSSI is computationally intensive. It is often impractical to perform such calculations for all APs within the range of a mobile device, because of limited processing capabilities, power consumption, and memory resources. Furthermore, as a result of multi-path effects, poor positioning, AP mobility, weak or inconsistent transmission power, or AP clock drift, some APs provide signaling which is not a reliable source of information for location calculations.

BRIEF SUMMARY

The techniques, processes and systems herein described may be implemented by way of a method that comprises obtaining a first set of distance data representing multiple calculated distances from a first access point (AP) in an indoor area, wherein the multiple calculated distances are calculated based on round trip time (RTT) information derived from communications with the first AP at multiple locations within the indoor area, accessing a distance threshold for the area, wherein the distance threshold is based on dimensions of the indoor area, determining, based on a comparison of the first set of distance data and the distance threshold, that a reliability condition is satisfied with respect to the first AP, and in response to determining that the reliability condition is satisfied with respect to the first AP, identifying the first AP for RTT-based location determination.

Other techniques and processes described herein may be implemented by way of a method that comprises obtaining a first set of distance data and a second set of distance data, wherein each of the sets represents multiple calculated distances from an access point (AP), wherein the calculated distances of the first set and the calculated distances of the second set are calculated based on round trip time (RTT) information derived from communications with the AP at a first location within the indoor area, and at a second location within the indoor area, respectively, calculating a first variability metrics a measure of consistency of the calculated distances of the first set, calculating a second variability metric as a measure of consistency of the calculated distances of the second set, determining, based on the first variability metric and the second variability metric, that a RTT reliability condition is satisfied with respect to the AP, and identifying the AP for RTT-based location determination.

This disclosure also describes a method comprising accessing a first set of distance data representing multiple calculated distances from an access point (AP) in an indoor area, wherein the calculated distances are calculated based on round trip time (RTT) information derived from communications with the AP at multiple locations within the area, accessing a second set of distance data representing multiple calculated distances from the AP, wherein the calculated distances are calculated based on received signal strength indicator (RSSI) information derived from communications with the AP at the multiple locations, calculating a correlation between the distance data in the first set and distance data in the second set, and determining that a reliability condition is satisfied with respect to the AP, wherein determining that the reliability condition is satisfied is based on the calculated correlation.

This disclosure also describes several apparatuses. One such apparatus comprises a processor configured to obtain a first set of distance data representing multiple calculated distances from a first access point (AP) in an indoor area, wherein the calculated distances are calculated based on round trip time (RTT) information derived from communications with the first AP at multiple locations within the area, the processor also configured to obtain a distance threshold for the area, wherein the distance threshold is based on dimensions of the area, as well as determine, based on the first set of distance data and the distance threshold, that a reliability condition is satisfied with respect to the first AP; and in response to determining that the reliability condition is satisfied with respect to the first AP, identify the first AP for RTT-based location determination, and a memory coupled to the processor.

An apparatus described herein comprises a processor configured to obtain a first set of distance data and a second set of distance data, wherein each of the sets represents multiple calculated distances from an access point (AP), wherein the calculated distances of the first set and the calculated distances of the second set are calculated based on round trip time (RTT) information derived from communications with the AP at a first location within an indoor area, and at a second location within the indoor area, respectively, calculate a first variability metric as a measure of consistency of the calculated distances of the first set, calculate a second variability metric as a measure of consistency of the calculated distances of the second set, determine, based on the first variability metric and the second variability metric, that a RTT reliability condition is satisfied with respect to the AP, and identify the AP for RTT-based location determination, and a memory coupled to the processor.

Another apparatus described herein comprises a processor configured to access a first set of distance data representing multiple calculated distances from an access point (AP) in an indoor area, wherein the calculated distances are calculated based on round trip time (RTT) information derived from communications with the AP at multiple locations within the area, access a second set of distance data representing multiple calculated distances from the AP, wherein the calculated distances are calculated based on received signal strength indicator (RSSI) information derived from communications with the AP at the locations, calculate a correlation between the distance data in the first set and distance data in the second set, determine that a reliability condition is satisfied with respect to the AP, wherein determining that the reliability condition is satisfied is based on the calculated correlation, and a memory coupled to the processor.

BRIEF DESCRIPTION OF THE DRAWINGS

Aspects of the disclosure are illustrated by way of example. In the accompanying figures, like reference numbers indicate similar elements, and:

FIG. 10 is a flow diagram which depicts certain example operations associated with performing a building dimensions evaluation, as described herein.

DETAILED DESCRIPTION

Figure 1A:
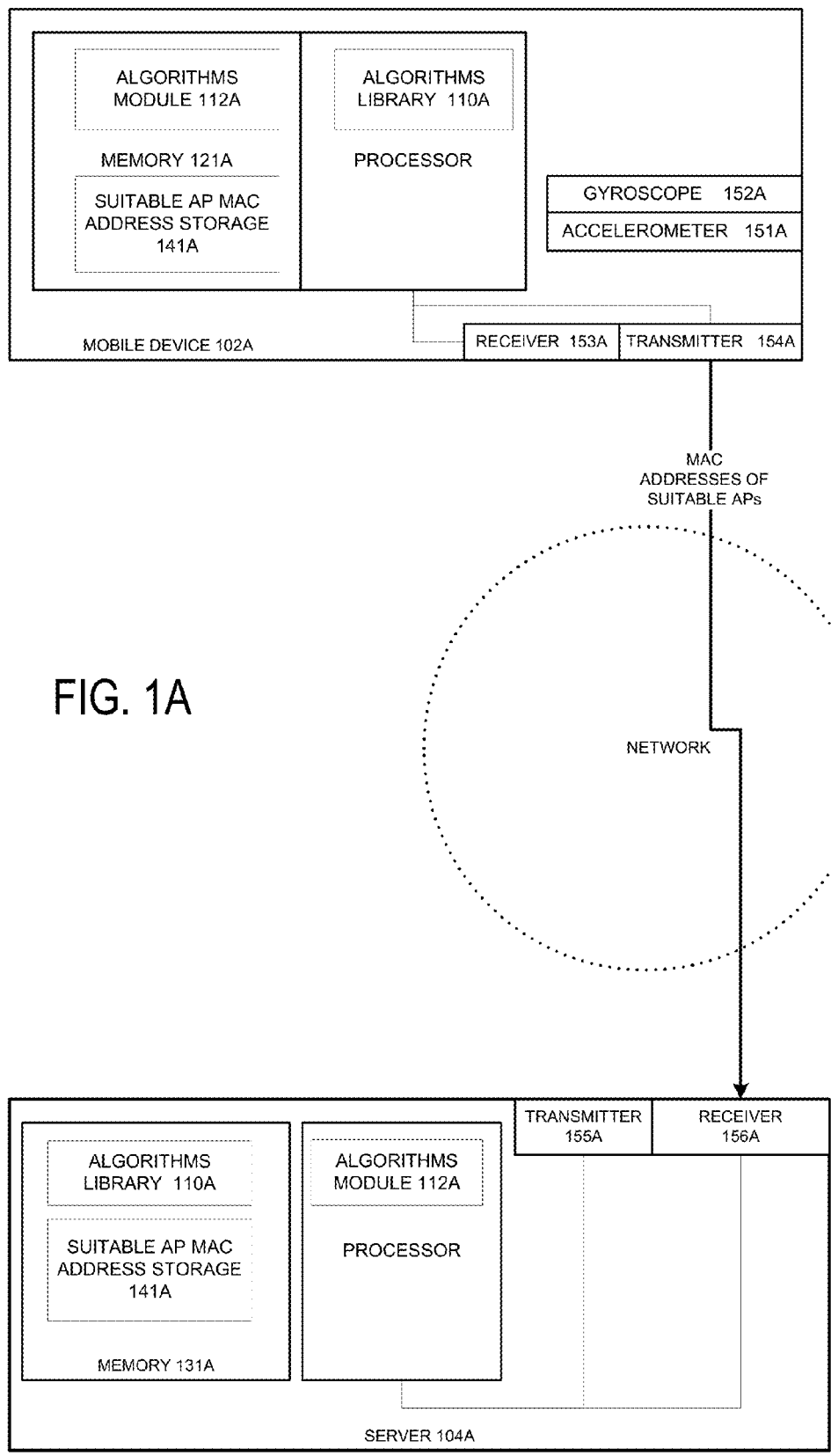
FIG. 1A illustrates a simplified diagram of one example mobile device and server configured to implement certain of the techniques, methods and processes disclosed herein.

This disclosure will describe systems, methods and procedures for performing several evaluations of the signals transmitted by APs located within an indoor area of interest. The evaluations facilitate characterizing, grouping, or selecting APs that provide signaling which can be used to determine RTT and which satisfies a reliability condition. Specifically, each evaluation can be used to test the detected APs with respect to a different reliability condition. When an AP meets certain conditions associated with the various evaluations, the AP may be designated as a reliable source of signaling, and its MAC address may be provided to mobile devices so that they may use the signals from the AP for making RTT-based position determinations. The various evaluations, each of which will be explained in detail with reference to corresponding figures, will be described using the following names which will be applied throughout this disclosure for the purpose of differentiating among the evaluations:

a) the building dimensions evaluation;
b) the RTT/RSSI correlation evaluation; and
c) the consistency of error evaluation.

Although the various evaluations herein disclosed will be described as being used together to generate a larger, more comprehensive evaluation, each evaluation provided by this disclosure may be used independently or in combination with other evaluations. Thus, this disclosure will include implementations in which all of the evaluations are performed together to obtain a final listing of APs, such that each listed AP meets the reliability condition of every evaluation. In addition, the scope of this disclosure shall be understood to cover the use or implementation of any of the evaluations, as well as any combination thereof It should be understood that, within this disclosure, the term AP is intended to describe any communications apparatus capable of sending and receiving wireless communications and serving as a connection point through which wireless devices may access a network. Thus, the term AP refers to a broad range of communications apparatuses, including base stations, Node Bs, femto cell base stations, piconet base stations, wireless hotspots, wireless routers, relay stations, cable or internet television systems configured for wireless communications, or any other similarly disposed wireless network nodes or entities.

Each evaluation of the present disclosure involves a data gathering process and an analytical process. Each of the data gathering processes is performed in accordance with distinct procedures which enable the corresponding analytical process to be performed reliably. Nonetheless, the various data gathering processes may be consolidated as part of a larger data gathering process which includes the steps of the various smaller processes. Although consolidated data gathering may be performed without affecting the results of the evaluations, this disclosure will describe a separate data gathering process for each evaluation, so as to enable each evaluation to be separately understood.

Several example techniques and implementations will now be described with respect to the accompanying drawings, which form a part hereof While particular examples involving the implementation of one or more aspects of this disclosure are described below, other implementations may be used without departing from the scope of the disclosure or the spirit of the appended claims.

Figure 1B:
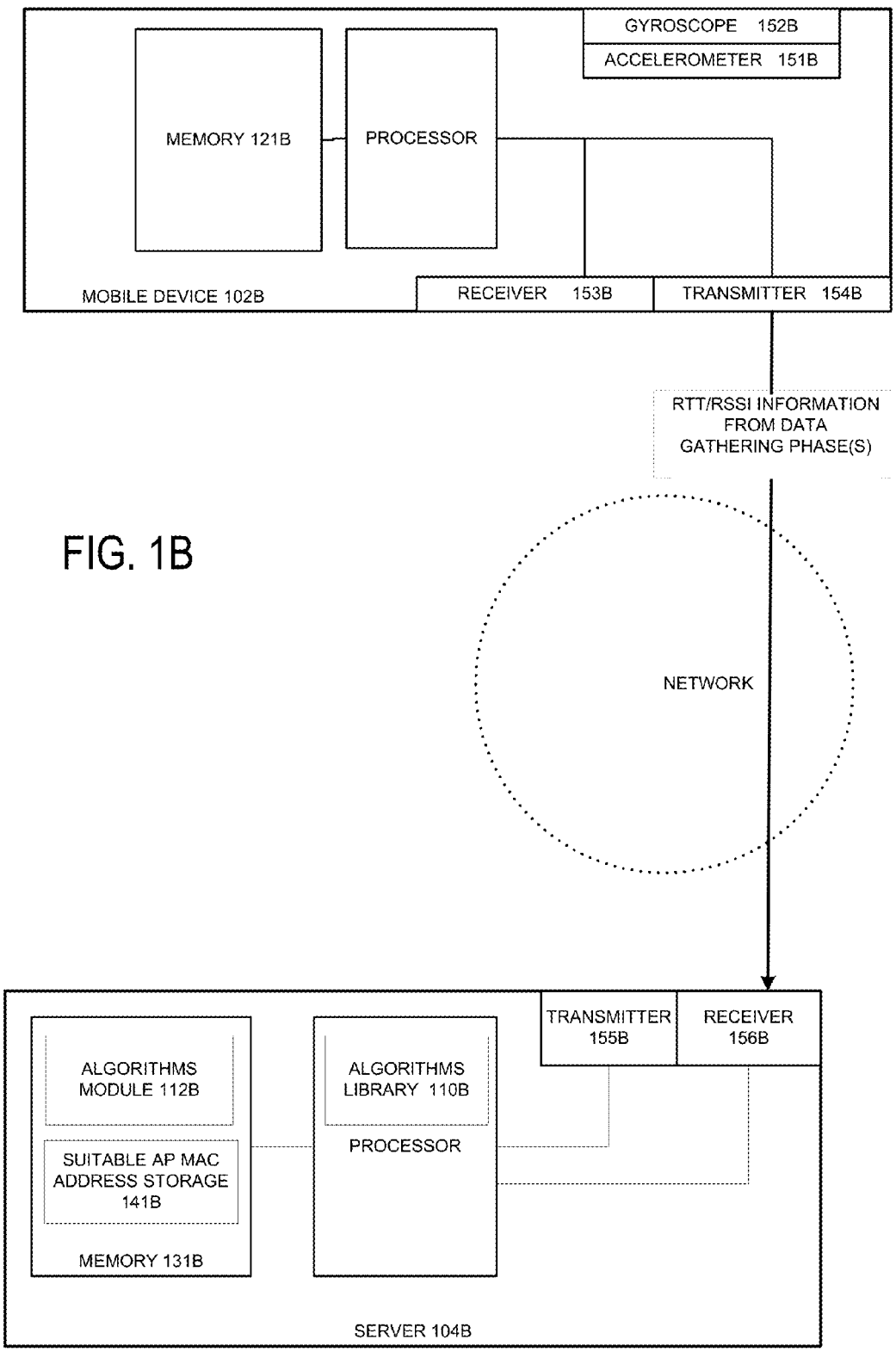
FIG. 1B illustrates a simplified diagram of another example mobile device and server configured to implement certain of the techniques, methods and processes disclosed herein.

FIG. 1A and FIG. 1B depict example systems 100A, 100B for implementing the evaluation techniques of the present disclosure. Systems 100A and 100B are alternative systems which are each configured to independently implement any or all of the evaluation techniques. Moreover, the capabilities of these systems are the same in most regards. As will subsequently be explained in greater detail, systems 100A and 100B differ with respect to the location where certain data processing and analysis is performed.

As depicted at 100A and 100B, for each evaluation, the data gathering process involves a mobile device 102A or 102B being used to obtain multiple instances of RTT information from each AP being evaluated in the indoor area. Mobile device 100A may be any type of mobile communications apparatus capable of performing any of the data gathering and processing tasks disclosed herein. Moreover, mobile device 100B may be any type of mobile communications apparatus capable of performing any of the data gathering and processing tasks disclosed herein.

The mobile device 102A, 102B also determines and records the AP MAC address of each AP being evaluated. The mobile device 102A, 102B derives or determines the RTT data and the MAC addresses based on signals transmitted by the evaluated APs.

As part of the data gathering processes, the mobile device 102A or 102B obtains RTT information by first detecting APs within the indoor area and determining the MAC address of each detected AP. From various locations throughout the indoor area, the mobile device 102A or 102B then transmits signals to these detected APs, and detects any response signals which the APs transmit. When the mobile device 102A or 102B receives a response to a transmission, mobile device processor 106A or 106B calculates RTT data based on the pair of signals (mobile device transmission and AP response). The mobile device processor 106a or 106b may also calculate RSSI from any received signals. However, as will be described in greater detail later on, RSSI data is analyzed as part of the analytical phase of the RTT/RSSI correlation evaluation. Thus, in the interest of processing efficiency, it may be preferable for mobile device 102A, 102B to omit calculating RSSI data, when data is not being gathered for the purpose of performing this evaluation.

The mobile device 102A, 102B may save each such instance of RTT or RSSI data for the purpose of enabling the data to be later analyzed during the analytical phases of the evaluations. Each instance of saved RTT data may be accompanied by a time stamp indicating when the observation was made, and a MAC address identifying the AP associated with the data. The mobile device 102A or 102B may store this information within a memory 121a, or 121b contained within the mobile device.

Additionally, when the mobile device 102A, or 102B registers an RTT data observation, the mobile device 102A or 102B may calculate its position. These position calculations may take the form of absolute positions calculated based on the strength of signals received from APs at known locations in the indoor area. Alternatively, the position calculations may be relative position calculations. For example, when the mobile device 102A or 102B registers an RTT sample at a location, the mobile device 102A, or 102B may determine its relative displacement from the location at which it previously registered an RTT sample. The mobile device 102A or 102B may calculate relative displacement based on data registered by an internal accelerometer 151A, 151B or gyroscope 152A, 152B, or by referencing any other sensors or processing any other data relevant to determining its position.

The mobile device 102A or 102B may use memory 121A, or 121B to store any position information associated with registered RTT samples. By storing RTT samples gathered at a variety of locations in the indoor area, along with corresponding MAC addresses, time stamps, and position information, the mobile device 102A, 102B accumulates a data record which can be analyzed during the analytical phases of the various evaluations of this disclosure.

Additionally or alternatively, certain RTT data observations may be stored in a way that logically links these observations to other RTT observations. For example, separate arrays, stacks, queues, linked lists or other data structures may be used to group multiple RTT observations associated with a common AP, or observations registered at a common time or location in the indoor area. Accumulating a data record in this organized manner may simplify data retrieval and processing performed during the analytical phases of the various evaluations described herein.

Server 104A, 104B includes a transmitter 155 and receiver 156 which facilitate communications with mobile device 102A, 102B. The server 104A, 104B stores MAC addresses of APs that have been detected by the mobile device 102A or 102B during the data gathering phase. The server 104A, 104B may also store results of any or all of the evaluations. For example, the servers 104A, 104B may store a MAC address of each initially-detected AP, but then delete, segregate or label the MAC address of any AP determined to not meet a reliability condition for RTT-based location fixing.

The server 104A, 104B is also configured to receive, store and process the RTT observations, corresponding MAC addresses, and other associated data gathered by mobile device 102A, 102B, and may analytically process this information as necessary to complete any of the evaluations. Mobile device 102A, 102B includes a receiver 153A, 153B and transmitter 154A, 154B, and uses these components to send and receive network communications, including communications with server 104A, 104B.

The mobile device 102A, 102B uses network communications to operate in conjunction with the server 104A or 104B or other similarly enabled remote computational entity. The mobile device 102A, 102B may communicate each RTT data observation, corresponding MAC address and other associated data to the server 104A, 104B, which may then analyze this data remotely to complete the evaluations. Additionally or alternatively, a mobile device may be configured to perform the analytical data processing associated with any of the evaluations. Specifically, mobile device 102A is depicted as having such a configuration.

FIG. 1A depicts that the mobile device 102A of system 100A includes an algorithms library 110A within memory 121a, and an algorithms module 112A within the processor. Algorithms library 110A may be encoded with instructions executable by the algorithms module 112A for executing the algorithms required to perform the various analytical processes of the evaluations described herein. Thus, the evaluations may be completed at mobile device 102A, without algorithmic processing being performed at server 104A. Nonetheless, in FIG. 1A algorithms library 110A and algorithms module 112A are also depicted as being disposed within server 104A. When such an arrangement is used in a system 100A, the algorithmic processing may be performed at the mobile device 102A or at the server 104A, or may be split between the mobile device and server.

Within system 100A, algorithms library 110a may be designed so that each evaluation algorithm, when executed, determines which APs satisfy the respective evaluation reliability condition and which APs do not. When two or more evaluations are being conducted, the algorithms module then 112A determines which APs satisfy all tested evaluation conditions. The mobile device then communicates the MAC addresses of these APs to server 104A, where the MAC addresses are stored as part of a list of APs deemed to be suitable for use in RTT-based location fixing.

With regards to system 100B, algorithms library 110B, algorithms module 112B and suitable AP MAC address storage 141B are contained within server 104B, as opposed to being disposed within mobile device 102B. For this reason, mobile device 102B transmits the gathered RTT, RSSI, position, time and MAC address data to the server 104B. After server 104B has received the RTT data, algorithms library 110B and algorithms module 112B are used to execute the analytical processing associated with the various evaluations. Following execution of all the analytical processing associated with the various evaluations, the algorithms module 112B is used to determine which APs satisfied each tested evaluation condition. The MAC addresses of these APs are then stored in memory 131B at server 104B, as part of a list of APs deemed to be suitable for use in RTT-based location fixing.

With respect to both systems 100A and 100B, the server 104A, 104B may subsequently transmit the MAC addresses of the suitable APs to other mobile devices which are brought into the indoor area. The server 104A, 104B may transmit the MAC addresses along with an indication that the addresses are associated with APs which are suitable for RTT-based location fixing. In this way, mobile devices brought within the indoor area may derive RTT-based position information using only APs which are suitable for this purpose.

Receiving the MAC addresses of suitable APs may enable the mobile devices to take advantage of a technique referred to hereinafter as "bootstrapping". Bootstrapping is used by a device capable of identifying APs which provide signaling known to be a reliable source of RSSI information for location fixing purposes. To perform bootstrapping, a mobile device also stores MAC addresses of APs which are reliable sources of RTT information for fixing. In this way, a mobile device may determine position based on RSSI data or RTT data, as appropriate based on needs or conditions.

For each evaluation disclosed herein, this disclosure will detail an example method for gathering the RTT data and any other data needed to perform the evaluation. This disclosure will also provide an example algorithm which algorithms module 112A, 112B may execute to perform the evaluation. With regards to certain evaluations, the procedures for data gathering and executing the associated analytical algorithm will be described together for purposes of convenience. Despite any such description, it should be understood that, in certain implementations of the techniques disclosed herein, the data gathering procedures may be executed at a mobile device such as device 102B, while the analytical algorithm may performed at a server such as server 104B.

Moreover, in light of this disclosure, many other procedures, sequences or algorithms which are not specifically described will nonetheless be easily and readily recognized as interchangeable with, or alternatives to, certain of the processes which this disclosure specifies. Any such alternative should be understood as being within the scope of this disclosure.

Also, it should be understood that despite specifically describing how one mobile device may perform data gathering in an indoor area, this disclosure should further be understood to be directed to the use of crowdsourcing during any or all of the data gathering processes. When crowdsourcing is used, many mobile devices receive signals transmitted by APs in the indoor area, derive RTT, RSSI, MAC addresses and any other data from the signals, and transmit the data to a crowdsourcing server. For example, both the description of server 104A and the description of server 104B is intended to suggest that either of these servers may have the ability to receive, store and process data obtained as a result of crowdsourcing involving any number of mobile devices.

When crowdsourcing is used, the mobile devices which perform data gathering may have some or all of the capabilities described with respect to mobile device 102A or mobile device 102B, and they may perform any or all of the functions which have been or will be described with respect to those example devices.

Figure 2:
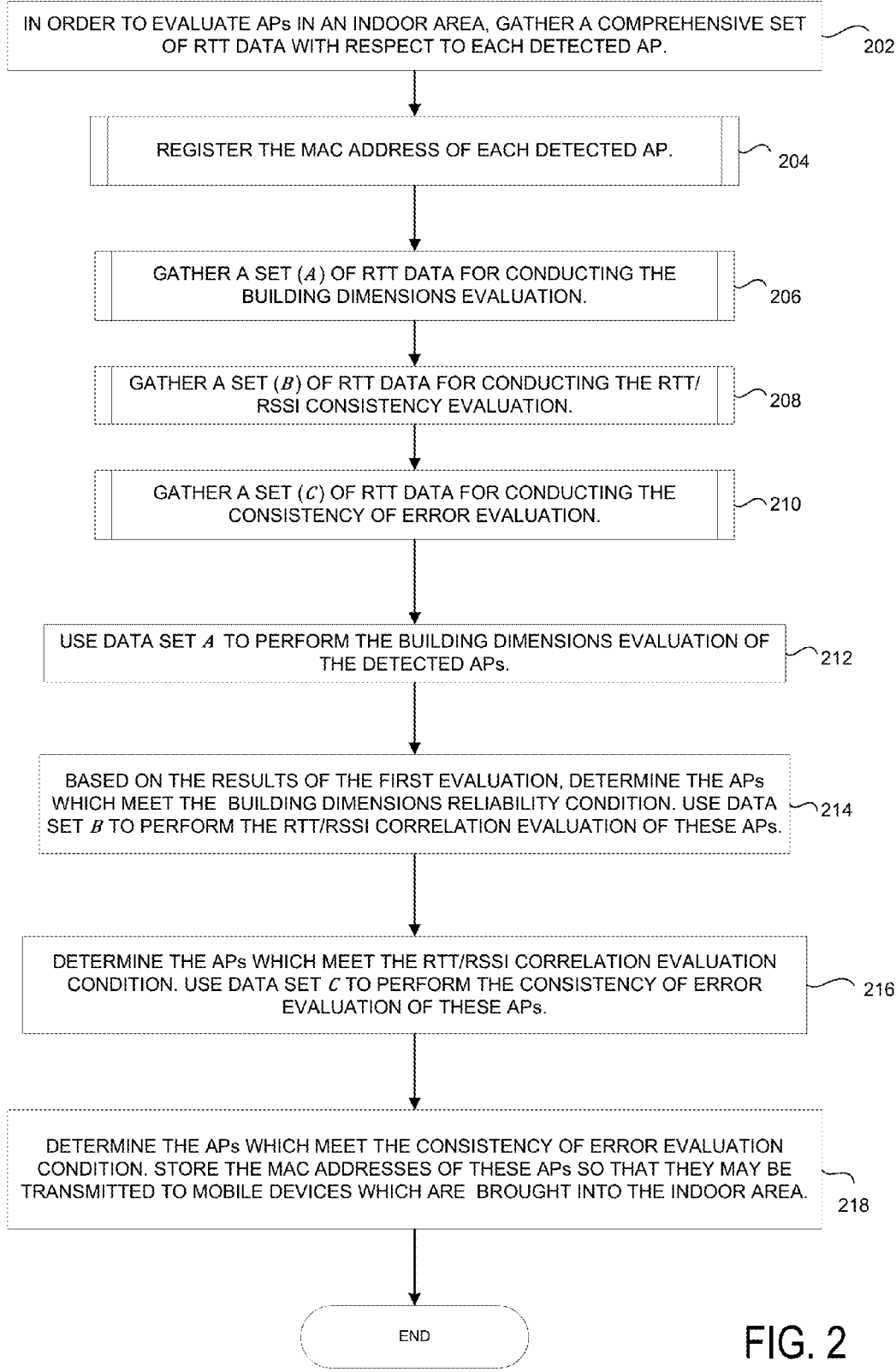
FIG. 2 is a flow diagram which depicts how the techniques of the present disclosure can be used in evaluating APs for reliability.

FIG. 2 provides an example sequence of evaluation operations which may be implemented using a system 100A or 100B of the present disclosure. The operations depicted in FIG. 2 are generalized. Moreover, FIG. 2 is intended only to depict one of many possible techniques within the scope of this disclosure for combining evaluations to determine APs which can be reliably used for RTT-based positioning calculations.

As depicted in FIG. 2, the operations start at 202. At 202, a mobile device 102A, 102B commences evaluation of APs detected in an indoor area of interest. The indoor area of interest may be a shopping mall, entertainment center, airport, or other venue within which multiple APs provide signaling and mobile device location fixing is needed. At 202, in order to conduct the evaluation, the mobile device 102A, 102B gathers a comprehensive set of RTT data with respect to each detected AP. Gathering data as depicted at 202 may involve multiple sub-processes 204, 206, 208, 210. At sub-process 204, mobile device 102A, 102B detects and records the MAC address of each AP which will be evaluated. At 206, the mobile device 102A, 102B gathers a set (A) of RTT data for evaluating the signaling of the evaluated APs using the building dimensions evaluation. At 208, the mobile device 102A, 102B gathers a set (B) of RTT and RSSI data for evaluating the signaling of the detected APs using the RTT/RSSI correlation evaluation. At 210, the mobile device 102A, 102B gathers a set (C) of RTT data for evaluating the signaling of the detected APs using the consistency of error evaluation. It should be understood that data sets A, B and C may or may not be mutually exclusive sets of data. That is, certain data within set A, B or C may also be part of the other two sets. After the completion of sub-process 210, the comprehensive gathering at 202 of RTT data is complete.

At this point, if a system such as the one depicted at 100B is used to implement the techniques of this disclosure, mobile device 102B transmits the data in set A, B and C to server 104B. This transmission step, however, is not depicted in FIG. 2. In this case, all subsequent steps depicted in FIG. 2 (212 and beyond) are performed at a server, such as server 104B.

As depicted at 212, the algorithms module 112A, 112B uses data set A to perform the building dimensions evaluation with respect to each of the evaluated APs.

At 214, after executing the building dimensions evaluation algorithm, the algorithms module 112A or 112B accesses a list of the detected APs which meet the reliability condition of the building dimensions evaluation. As will later be explained in greater detail when the building dimensions evaluation is described, this list may be thought of as the output of the algorithm executed at 212. Furthermore, at 214, the algorithms module 112A or 112B uses data set B to execute the RTT/RSSI correlation evaluation algorithm with respect to the APs determined to meet the building dimensions evaluation condition.

At 216, the algorithms module 112A or 112B identifies the APs which, as indicated by the results of the RTT/RSSI correlation evaluation algorithm, also meet the reliability conditions of that evaluation. Furthermore, at 218, the algorithms module 112A or 112B uses data set C to execute the consistency of error evaluation algorithm with respect to the APs identified at 216.

At 218, the algorithms module 112A or 112B identifies the APs which meet the consistency of error evaluation condition. These APs may be treated as being reliable for mobile device RTT-based location fixing, since each one meets every evaluation reliability condition. For that reason, at 222, the MAC addresses of these APs are stored in memory 131A, 131B at server 104, 104B. A storage format, such as a separate, file, array, list or indexing scheme is used to indicate that the stored MAC addresses are associated with suitable APs. Although not depicted in FIG. 2, in implementations involving an arrangement such as the one described with respect to system 100A, the mobile device 102A first transmits these MAC addresses of suitable APs to server 104A, prior to storage of the addresses in memory 131B.

After server 104A, 104B stores the MAC addresses in memory 131A, 131B, the server may access the stored MAC addresses as needed, so that the server 104A, 104B may transmit the addresses to mobile devices brought into the indoor area. These mobile devices may then use the MAC addresses to identify signals from which RTT information may be derived for the purpose of using the information in performing location fixing.

The building dimensions evaluation technique involves quantifying the variability of RTT information received from each AP being evaluated, and analyzing the variability in light of the known dimensions of the building area in which the APs are located. To analyze the variability of the RTT information provided by an AP, a mobile device 102A, 102B is used to gather data at a location in the building. At the location, the mobile device 102A, 102B is held stationary for a prolonged period of time so that RTT information can be repeatedly obtained based on several transmissions received from the AP.

Subsequently, a distance from the AP is computed for each instance of RTT information obtained at the location. Once these distance calculations are obtained, the distribution of calculated distances is evaluated by comparing the variability in calculated distances to the dimensions of the building. If the distribution of distances is large relative to the dimensions of the building, the AP is categorized as not providing reliable RTT signaling and timing information. If the distribution of distances is modest relative to the dimensions of the building, a new location is selected and the process is repeated to ensure that the distribution of distances relative to the dimensions of the building is modest at all locations throughout the building.

In one implementation of the building dimensions evaluation, a distribution which is large relative to the dimensions of the building may be a distribution containing a high percentage of calculated distances in excess of the length of an imaginary line bisecting the building between opposite building corners. For example, in a shopping center with a 1,000 foot×1,000 foot floor plan, a bisecting line between opposite corners would be 1,401 feet in length. Thus, in evaluating an AP, if distances calculated at a given location are frequently far in excess of 1,400 feet, the building dimensions evaluation condition may be deemed to be not satisfied by the AP.

If, for any single location at which RTT data is registered, the distribution of distances is large relative to the dimensions of the building, the AP may be categorized as providing unreliable RTT signaling and timing information. However, if the distribution is modest at each of the tested locations, the building dimensions evaluation condition may be deemed to be satisfied with respect to the AP.

Figure 3:
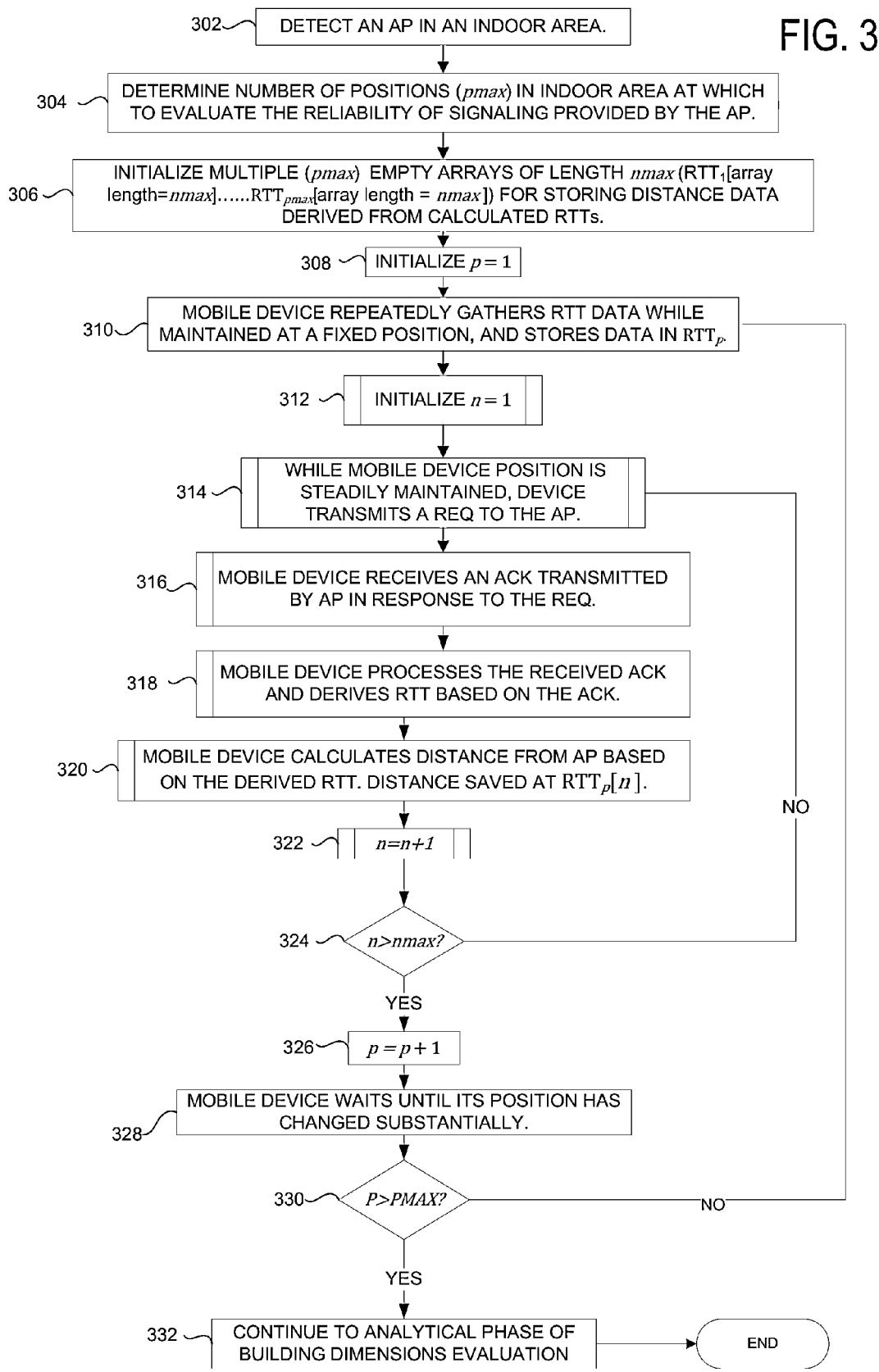
FIG. 3 is a flow diagram which depicts an example data gathering process for gathering data for performing the building dimensions test, in accordance with the techniques described herein.

FIG. 3 is a flow diagram depicting an example sequence of operations which may be used by a mobile device 102A, 102B to gather data for the building dimensions evaluation. The operations, as depicted, are applicable for gathering data with respect to a single evaluated AP. However, the depicted operations may be repeated with respect to any number of detected APs in an indoor area. Moreover, FIG. 3 does not depict example analytical processes which may be used to complete the building dimensions evaluation. Rather, these processes are depicted in FIG. 4

Figure 4:
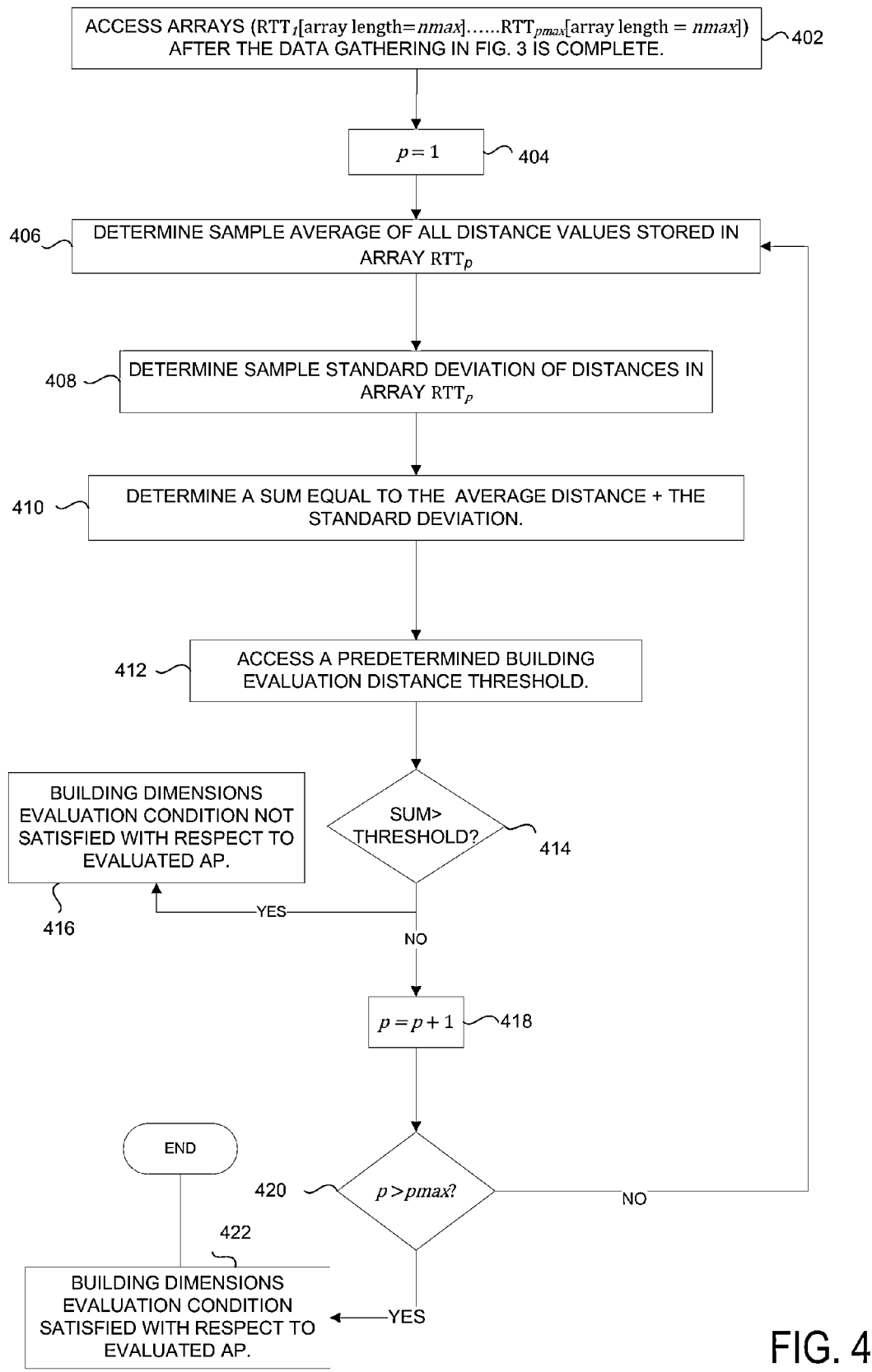
FIG. 4 is a flow diagram which depicts certain analytical operations associated with performing the building dimensions evaluation, in accordance with the techniques described herein.

FIG. 4 references certain data and data storage structures which are first described in FIG. 3 and the discussion thereof. For example, the discussion of FIG. 3 as well as discussions of following figures, will refer in several instances to various uses of arrays for data storage and analytical purposes. These usage of arrays are described only for explanatory purposes, so as to enable the storage and processing of a sequential ordering of numbers to be easily conceptualized. The description of arrays is not meant to imply the use of these specific structures, or limit this disclosure in any way. Thus, where this disclosure refers to an array, the disclosure shall be understood to cover any other abstract structure or object used in place of an array, provided that certain mathematical, processing, or storage capabilities provided by an array are also provided by such alternative. Thus, the term array shall be understood as broadly encompassing any abstraction involving the sequential ordering of numbers, to include linked lists, arrays, stacks, queues, sequences, tuples, matrices, indexed sets or the like.

As depicted in FIG. 3, data gathering for the building dimensions evaluation may begin at 302. At 302, a mobile device 102A or 102B detects an AP in an indoor area. Detecting the AP may involve determining the detected AP's MAC address, and storing the MAC address in mobile device memory 121A, 121B. At 304, the mobile device 102A, 102B determines a number of sampling positions (pmax) at which to obtain data for evaluating the detected AP using the building dimensions evaluation. In this regard, it may frequently be beneficial to utilize a statistically significant number of sampling positions (e.g. more than 30) for obtaining data. The number pmax may be a parameter which is hard encoded in mobile device 102A, 102B. Alternatively, pmax may be a parameter which is adjustable through an operator input to the mobile device 102A, 102B.

At 306, the mobile device 102A, 102B initializes pmax empty arrays (or other similar data storage structure) of length nmax (arrays $RTT_1 \ldots RTT_{pmax}$). These arrays will store data in such a way that, for each individual one of these arrays, RTT distances calculated at a common location will be stored therein.

At 308, a counter (p) is initialized to 1. At 310, the mobile device commences a process involving repeatedly gathering RTT data at the mobile device's location, and saving the data in $RTT_p$. The process 310 consists of sub-process 312, as well as multiple iterations of sub-processes 314-324. At sub-process 312, the mobile device initializes a counter variable (n) to 1. Subsequently, the mobile device executes subprocesses 314-324 until n is greater than nmax. At sub-processes 314, while the mobile device 102A, 102B detects that it is being maintained at a near-constant position, the mobile device transmits a REQ to the AP. The mobile device 102A, 102B may detect that its position is nearly constant by processing accelerometer data, or data from any other sensors which indicate mobile device velocity. At 316, the mobile device 102A, 102B receives an ACK transmitted by the AP in response to the REQ. At 318, the mobile device processes the received ACK and derives RTT based on the ACK.

At 320, the mobile device 102A, 102B calculates a distance from the AP based on the RTT data derived at 318. The mobile device 120A, 102B stores the calculated distance value in the array $RTT_p$, at position $RTT_p$ [n]. At 322, the mobile device 102A, 102B increments n. At 324, the mobile device 102A, 102B compares n to nmax. If n is not greater than nmax at 324, the mobile device 102A, 102B executes steps 314-324 again, and repeats that process until n is greater than nmax. If n is greater than nmax, then the array RTTp is full.

After the mobile device 102A, 102B determines that n is greater than nmax, it increments p as depicted at 326. At 328, the mobile device 102A, 102B determines whether p is greater than pmax. If p is greater, the process ceases because all arrays $RTT_1 \ldots RTT_{pmax}$ have been filled. Subsequently, a device having the capabilities of device 102A may commence the analytical phase by executing the algorithm depicted in FIG. 4. On the other hand, a device such as mobile device 102B may transmit the data in arrays $RTT_1 \ldots RTT_{pmax}$ to server 104B, so that the server may execute the algorithm depicted in FIG. 4.

As described previously, FIG. 4 depicts an algorithm for completing the analytical phase of the building dimensions evaluation. The algorithm of FIG. 4 may be executed by a mobile device such as the device depicted at 102A, or by a server such as the one depicted at 104B.

The algorithm begins at 402. As depicted at 402, server 104B or mobile device 102A accesses the arrays after these arrays are filled with data in the manner described with regards to FIG. 3. $RTT_1 \ldots RTT_{pmax}$ At 404, the mobile device 102A or server 104B initializes a counting variable (p) to 1. At 406, the mobile device 102A or server 104B determines the average distance ($\mu$) in array RTTp. Then, at 408, the mobile device calculates the standard deviation ($\sigma$) of distances in the array RTTp. At 408, the mobile device 102A or server 102B calculates a sum ($\mu+\sigma$) by adding the average distance computed at 404 and the standard deviation computed at 406.

At 412, the mobile device 102A or server 102B accesses a predetermined building evaluation distance threshold. This threshold may be calculated prior to commencing the evaluation of APs in the building. The threshold may be determined based on a best estimate of the longest possible line-of-sight signal path obtainable within the confines of the building, and a scaling of the best estimate by an allowable error tolerance. The buildings floorplan, wall locations, and dimensions may serve as the basis for the estimate. For example, in a building with a simple rectangular floorplan, the threshold may be, for example, 140% of the distance of a line which bisects the building between two opposite corners.

At 414, the server 104B or mobile device 102A compares the sum calculated at 410 to the threshold. If the sum exceeds the threshold, the mobile device 102A or server 104B determines that the building dimensions evaluation condition is not satisfied with respect to the AP. This decision is depicted at 416. Accordingly, the analytical processing may be discontinued at that point.

However, if, at 414, the sum exceeds the threshold, then the mobile device 102A or server 104B increments P at 418, and then determines if p exceeds pmax, as depicted at 420.

If p does exceed pmax, then the mobile device 102A or server 104B determines that the building dimensions evaluation condition is satisfied with respect to the AP. This determination is depicted at 420. If p does not exceed pmax, then the mobile device 102A or server 104B performs another iterations of steps 404 and beyond. The steps 406-420 are then repeatedly executed in sequence until either the exit condition at 416 or 420 is satisfied.

Figure 5:
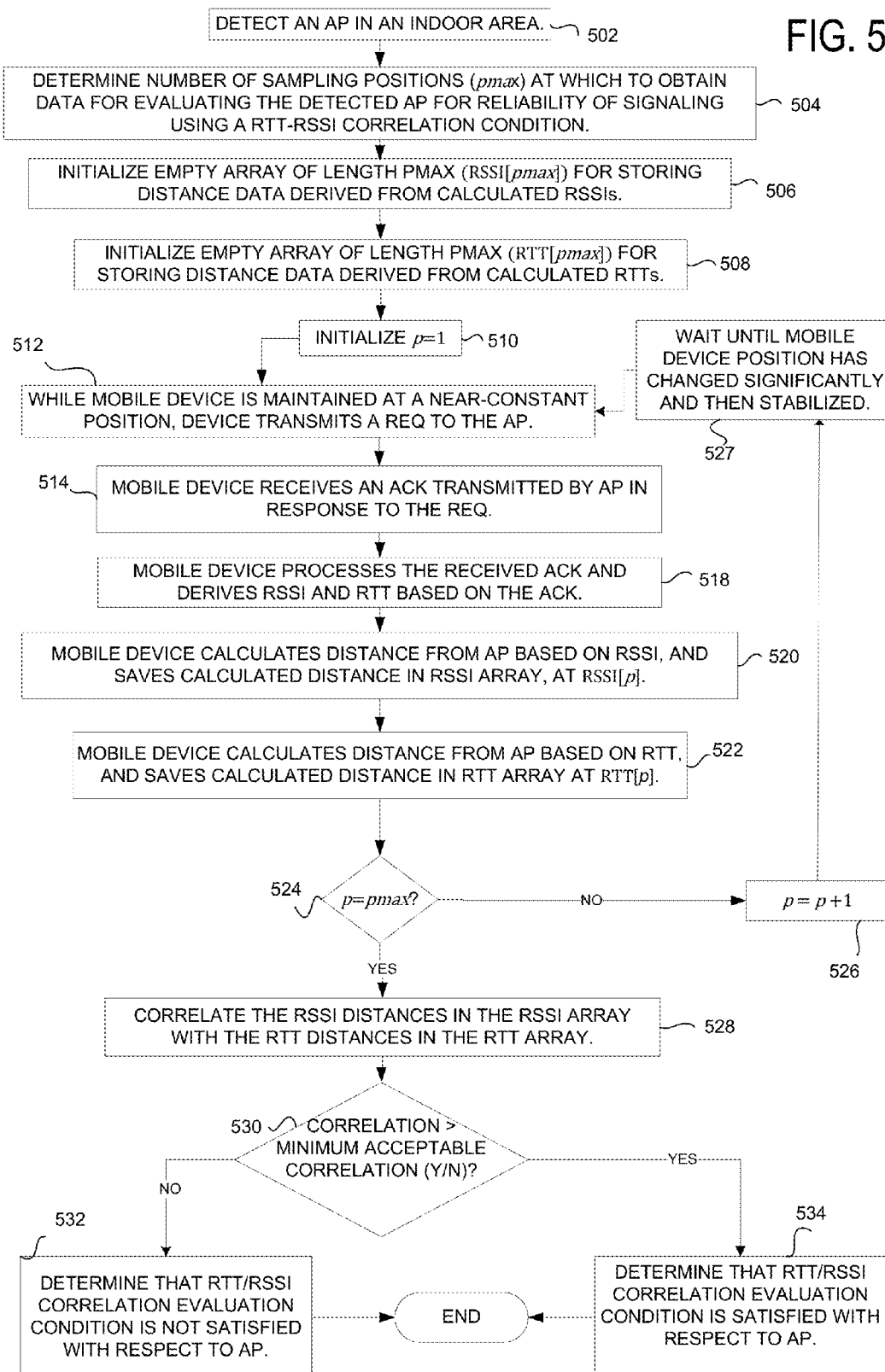
FIG. 5 is a flow diagram which depicts certain example operations involved in performing the RTT/RSSI correlation evaluation.

FIG. 5 explains an example process for performing the RTT/RSSI correlation evaluation. The RTT/RSSI correlation evaluation tests RTT data derived from an AP's signals and timing information for consistency with RSSI data derived from the AP's transmissions. Commonly, RSSI data is more reliable, accurate and consistent than RTT data. For this reason, when both RSSI and RTT are determined from signals received at a fixed location, separately calculating mobile device separation from the transmitting AP based on these two data sources will normally result in a discrepancy. This discrepancy may exist even when the RTT data is such that its use in calculating positions will yield accurate results. Thus, comparing RTT data and RSSI data registered at a same location may reveal little about the nature of the RTT data with respect to the calculation of positions.

However, if this calculation process is repeated at several different locations, the sequence of RTT-based calculations should be correlated with the RSSI-based correlations. A lack of correlation in this regard is an indication that RTT does not increase monotonically with increasing distance from the AP, or that RTT data derived from the AP's signals is unreliable for other reasons.

The evaluation algorithm of FIG. 5 is designed with this fact in mind The following discussion will describe how the techniques shown in FIG. 5 can be used to analyze a single AP. In actuality, the technique may be applied to numerous APs by repeating the technique for each AP. Thus, it should be understood that the processes referred to in the following paragraphs may be executed one time for each detected AP being evaluated.

The RTT/RSSI correlation evaluation begins at 502. At 502, a mobile device 102A, 102B detects an AP in an indoor area. Detecting the AP includes determining the detected AP's MAC address, and storing the MAC address in mobile device memory 121A, 12B. At 502, the mobile device 102A, 102B determines a number of sampling positions (pmax) at which to obtain data for evaluating the detected AP using the RTT/RSSI correlation evaluation. In this regard, it may frequently be beneficial to utilize a statistically significant number of sampling positions (e.g. more than 30) for obtaining data. The number pmax may be a parameter which is hard encoded in mobile device 102A, 102B. Alternatively, pmax may be a parameter which is adjustable through an operator input to the mobile device 102A, 102B.

At 506, the mobile device 102A, 102B initializes an empty array (or other similar data storage structure) of length pmax. This array will be referred to as RSSI, and will be used to hold RSSI data. Also, at 508, the mobile device 102A, 102B initializes an empty array (or other similar data storage structure) of length pmax which will be referred to as RTT. Array RTT will be used to hold RTT data.

At 510, a counter (p) is initialized to 1. At 512, while the mobile device 102A, 102B detects that it is being maintained at a near-constant position, the mobile device transmits a REQ to the AP. The mobile device 102A, 102B may detect that its position is nearly constant by processing accelerometer data, or data from any other sensors which indicate mobile device velocity. At 514, the mobile device 102A, 102B receives an ACK transmitted by the AP in response to the REQ. At 518, the mobile device processes the received ACK and derives RSSI and RTT based on the ACK.

At 520, the mobile device calculates a distance from the AP based on RSSI, and stores the calculated distance value in the RTT array, at position RSSI[p]. At 522, the mobile device calculates a distance from the AP based on RTT, and stores the calculated distance value in the RTT array, at position RTT[p]. At 524, the mobile device determines whether p is equal to pmax. If p is equal to pmax, then the mobile device proceeds to 528, which will be described later.

If P is not equal to pmax, the mobile device 102A, 102B increments p at 526. At 516, the process temporarily ceases until the mobile device 102A, 102B detects that its position has significantly changed, and then stabilized. Subsequently, the mobile device performs subsequent iterations of steps 512-527, until any such time that P is determined to be equal to pmax at 524.

Once p is determined to be equal to pmax at 524, a mobile device such as device 102B may transmit the information in the RSSI and RTT arrays to server 104B. Server 104B may then execute steps 528 and beyond. The transmission of RSSI and RTT information is not specifically depicted in FIG. 4. When a mobile device such as device 102A is used, steps 528 and beyond may be executed by the mobile device.

At 528, the mobile device 102A or server 104B correlates the data in the RTT array with the data in the RSSI array. This correlation calculation yields a correlation coefficient. At 530, the correlation coefficient is compared to a minimum acceptable correlation coefficient. The minimally acceptable correlation coefficient may be a predetermined parameter based on laboratory or research testing, prior to the evaluation of the indoor area APs in the manner herein described.

As depicted at 533, if the correlation coefficient is less than the minimum acceptable correlation coefficient, the RTT/RSSI correlation evaluation criteria is not satisfied with respect to the AP. However, at 534, if the correlation coefficient is greater than the minimum acceptable correlation coefficient, the RTT/RSSI correlation evaluation criteria is satisfied with respect to the AP.

Figure 6:
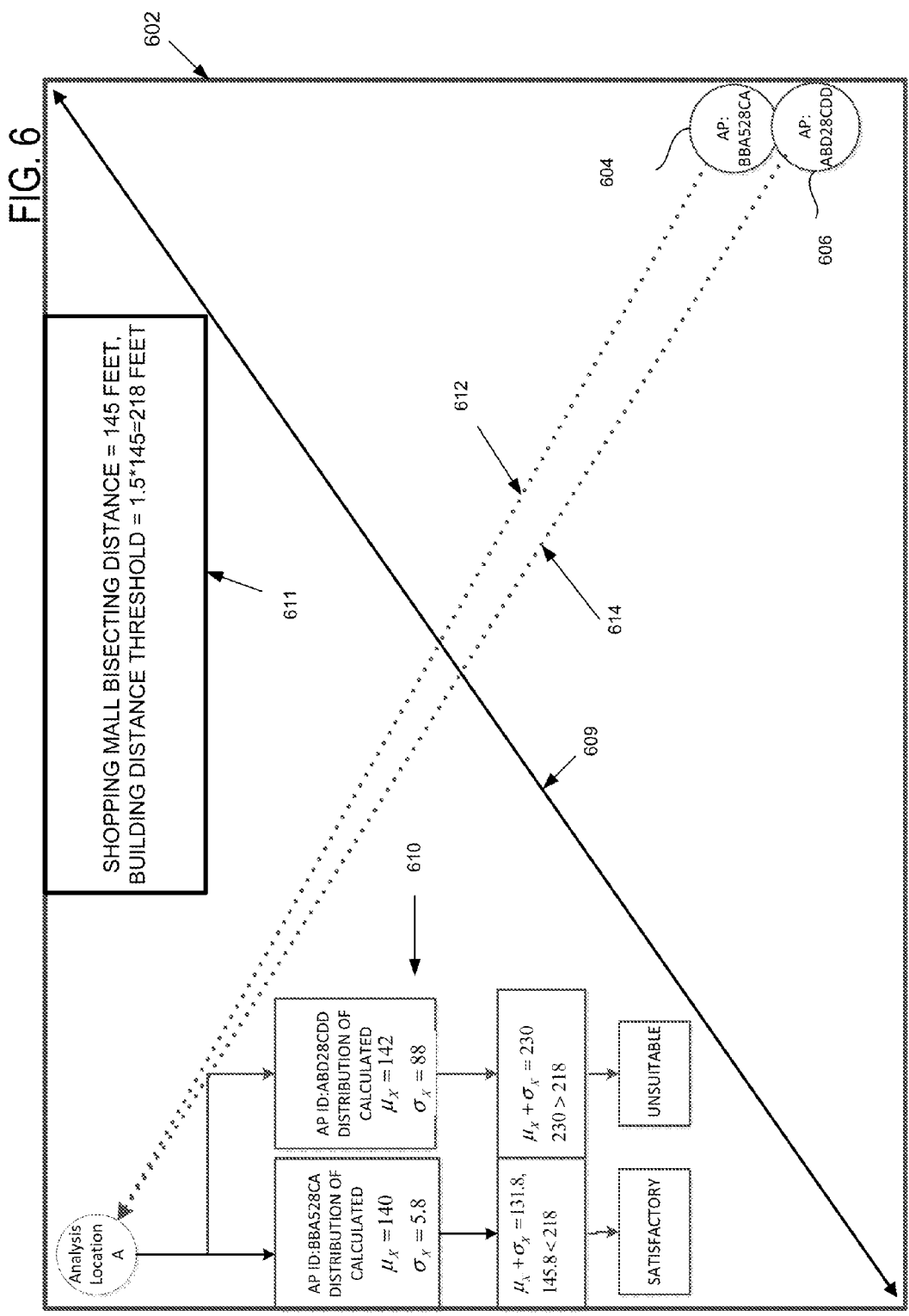
FIG. 6 is a diagram depicting example calculations and processes involved in using the building dimensions evaluation to analyze the signaling of two different APs.

FIG. 6 depicts example calculations and processes involved in using the building dimensions evaluation to analyze the signaling of two different APs. As depicted in FIG. 6, indoor area 602 is a shopping mall having exterior walls set in a rectangular shape. Information about the shopping mall is shown at 611. The information includes a building distance threshold equal to 150% of the shopping mall bisecting distance (i.e. 150% of the estimated longest line-of-sight signal path in the shopping mall). The APs 604 and 606 are depicted at their respective locations. However, it should be understood that mobile device 102A or 102B, while gathering data for the buildings dimension evaluation, may not have information about the locations of APs 604 and 606.

As depicted, while located at Analysis Location A (610), the mobile device 102A or 102B has received a sample of signals transmitted by AP 604 and a sample of signals transmitted by AP 606. Based on these signals, RTT data has been derived. Each instance of data derived from signals transmitted by AP 604 is used to calculate the distance 612 between that AP and Location A. Similarly, each instance of data derived from signals transmitted by AP 606 is used to calculate the distance 514 between that AP and Location A. The result is two distinct samples of distance calculations, such that the first sample corresponds to AP 604, and the second sample corresponds to AP 606.

At 620, FIG. 6 separately shows the average distance within the sample of distances calculated with respect to AP 606 and the average distance within the sample with respect to AP 604. At 620, the sample standard deviation is also shown. At 622, separate sums are shown for each sample. Each sum is a sum of the sample average distance and standard deviation.

The sum for AP 606 exceeds the building threshold. Thus the building dimensions evaluation condition is not satisfied with respect to AP 606 during the trial depicted in FIG. 6. In contract, the sum for AP 604 is less than the building threshold. Thus, the building dimensions evaluation condition may be satisfied with respect to AP 604, provided that similar results are obtained when the mobile device 102A, 102B gathers data at other locations in the building.

An additional evaluation technique disclosed herein is performed to identify APs which provide RTT signals and timing information characterized by consistency which depends on the position of a receiving device. This evaluation is premised on the idea that, for an AP to be suitable for use in RTT location fixing, a sample of line-of-sight (LOS) RTT calculations determined at a fixed location within the area of interest should display a variance similar to LOS RTT samples similarly calculated at any other location in the area. That is, if LOS RTT is calculated multiple times at one location (an RTT sampling), the variance within this RTT sample should be the same as the variance within a sample of LOS RTTs calculated at any other location.

The consistency of error evaluation can be used to determine whether RTT data derived from the signaling of an AP will yield consistent results when used in location calculations. The data gathering phase of the consistency of error evaluation is conducted by positioning a mobile device where a LOS signal propagation path exists between the evaluated AP and the mobile device 102A, 102B. The mobile device may detect the LOS path by analyzing signals received from the AP for the presence of multi-path interference. When an absence of multi-path interference is determined, the AP is likely to be at an LOS location. When such a location is identified, the mobile device is held at this position for a period of time sufficient for the device to receive a series of signals from the AP. The device receives these signals and, for each one, calculates and stores an RTT. The multiple calculated RTTs calculated may be stored as a first sample of RTTs, and may be stored in a common array or data structure, or may be otherwise indexed to the location.

The mobile device then repeats the sampling and calculation process at several different locations along the same LOS. In this way, several RTT samples are gathered in a manner such that each sample corresponds to a different LOS position. Additionally, a sample standard deviation is calculated for each sample.

After sampling is complete, a sample standard deviation (or variance) is calculated for each sample. Sample standard deviation is then itself treated as a random variable, and a standard deviation is then calculated with respect to this random variable. That is, the standard deviation of the sample standard deviations is calculated to determine the consistency of RTT data from location to location.

Figure 7:
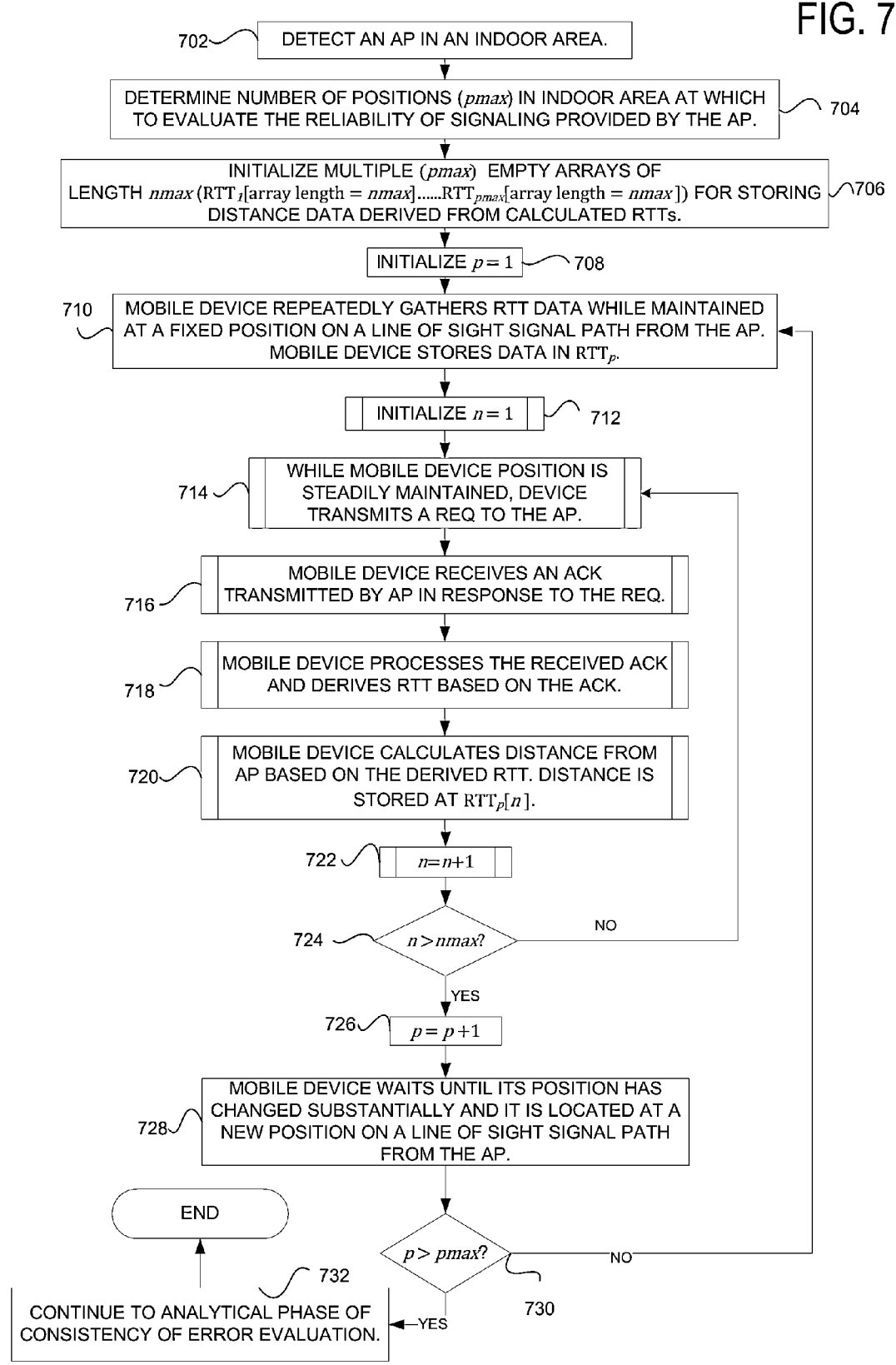
FIG. 7 is a flow diagram which depicts operations of a mobile device or server while executing an algorithm that may be used in performing a consistency of error evaluation.

FIG. 7 depicts operations of a mobile device 102A or server 102B while executing an algorithm which may be used to complete the analytical phase of the consistency of error evaluation.

It should be noted that the operations depicted in FIG. 7 are very similar to the operations discussed with regards to the example data gathering process of FIG. 2, which may be used to complete the data gathering process associated with the building dimensions evaluation. The only difference between these two processes is that, in performing the data gathering for the consistency of error evaluation (depicted in FIG. 7), the mobile device 102A, 102B performs all signal sampling at positions which are on a LOS path from the evaluated AP. The use of LOS locations is described in FIG. 7, at 710 and 726. Apart from this difference, the remaining steps (702-708, 712-732) and their ordering do not differ from steps 302-308, and 312-332 shown in FIG. 3. As such, a detailed description of these steps will not be repeated herein.

Figure 8:
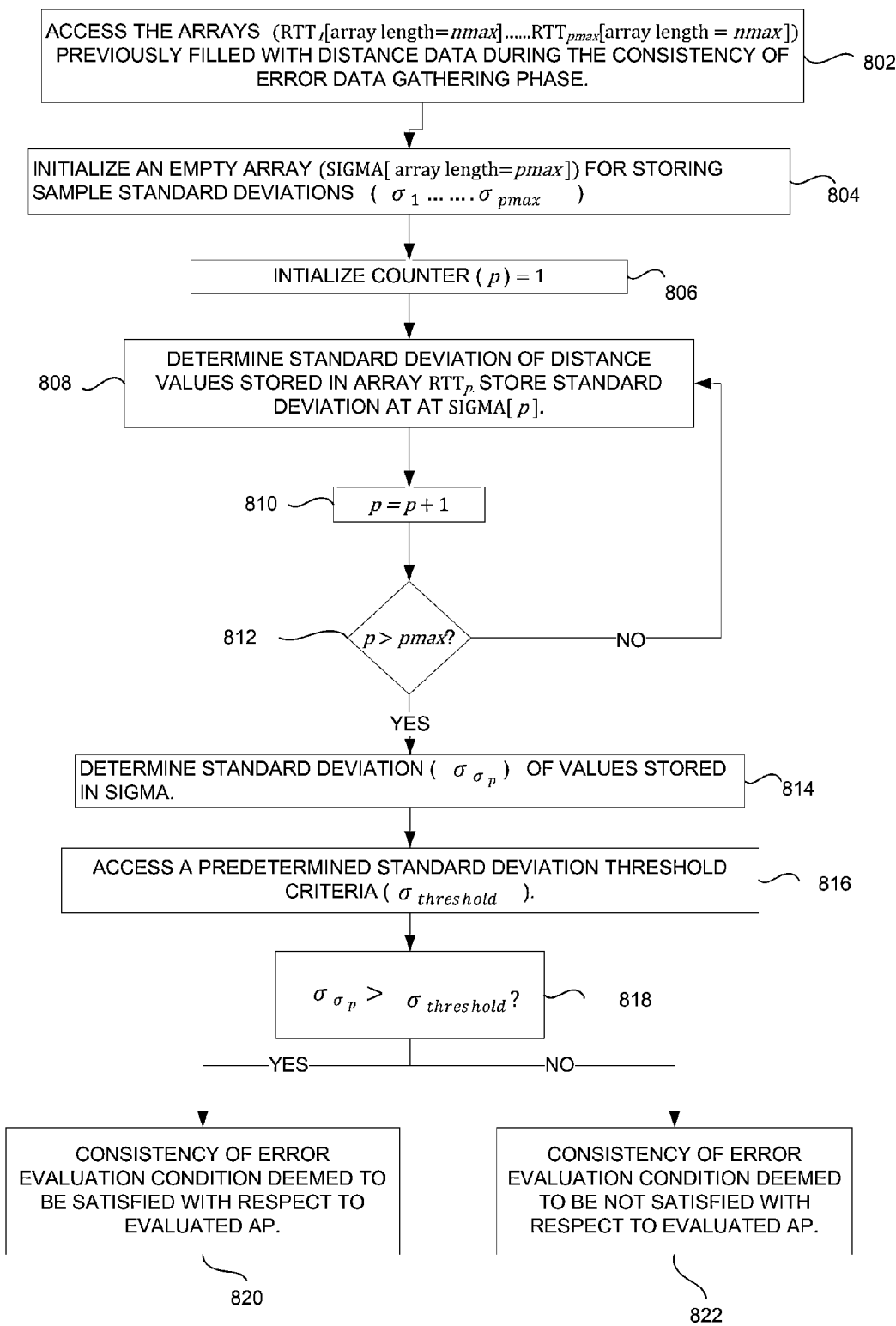
FIG. 8 is a flow diagram which depicts an example analytical phase algorithm for a consistency of error evaluation.

With regards to the depiction of an example analytical phase algorithm for the consistency of error evaluation in FIG. 8, the algorithm may be executed by a mobile device 102A or server 104B. The algorithm begins at 802. As depicted at 802, the mobile device 102A or server 102B accesses the arrays previously used to store distance information during the data gathering phase of the evaluation (in FIG. 7). At 804, the mobile device 102A or server 102B initializes an empty array (referred to in the FIG. as "sigma") for storing sample standard deviations which will be calculated for each LOS position at which data was gathered during the data gathering phase. At 806, the mobile device 102A or server 104B initializes a counter (p) to the value of 1. At 808, the mobile device 102A or server 104B determines the standard deviation of the distance values in the array $RTT_p$. Moreover, it stores the standard deviation value at SIGMA[p]. at 810 the mobile device 102A or server 104B increments the value of p. At 812, the mobile device 102A or server 104B determines whether p is greater than pmax.

If p is greater than pmax, steps 808-812 are iterated repeatedly until p is greater than pmax at 812. At 812, anytime that p is determined to be greater than pmax, the standard deviation of the values stored in the sigma array is then calculated, as depicted at 814. Next, at 816, the mobile device 102A or server 104B accesses a predetermined standard deviation threshold. The threshold can be previously determined in a testing and evaluation setting, by performing the consistency of error evaluation with respect to a large sample of APs which are known to facilitate accurate location calculations based on RTT.

At 818, if the standard deviation of the values stored in the sigma array is greater than the threshold, then the consistency of error evaluation condition is deemed to be not satisfied with respect to the AP. This outcome is explained at 820. Conversely, as explained at 822, if the standard deviation of the values stored in the sigma array is less than the threshold, then the consistency of error evaluation condition is deemed to be satisfied with respect to the evaluated AP.

Figure 9:
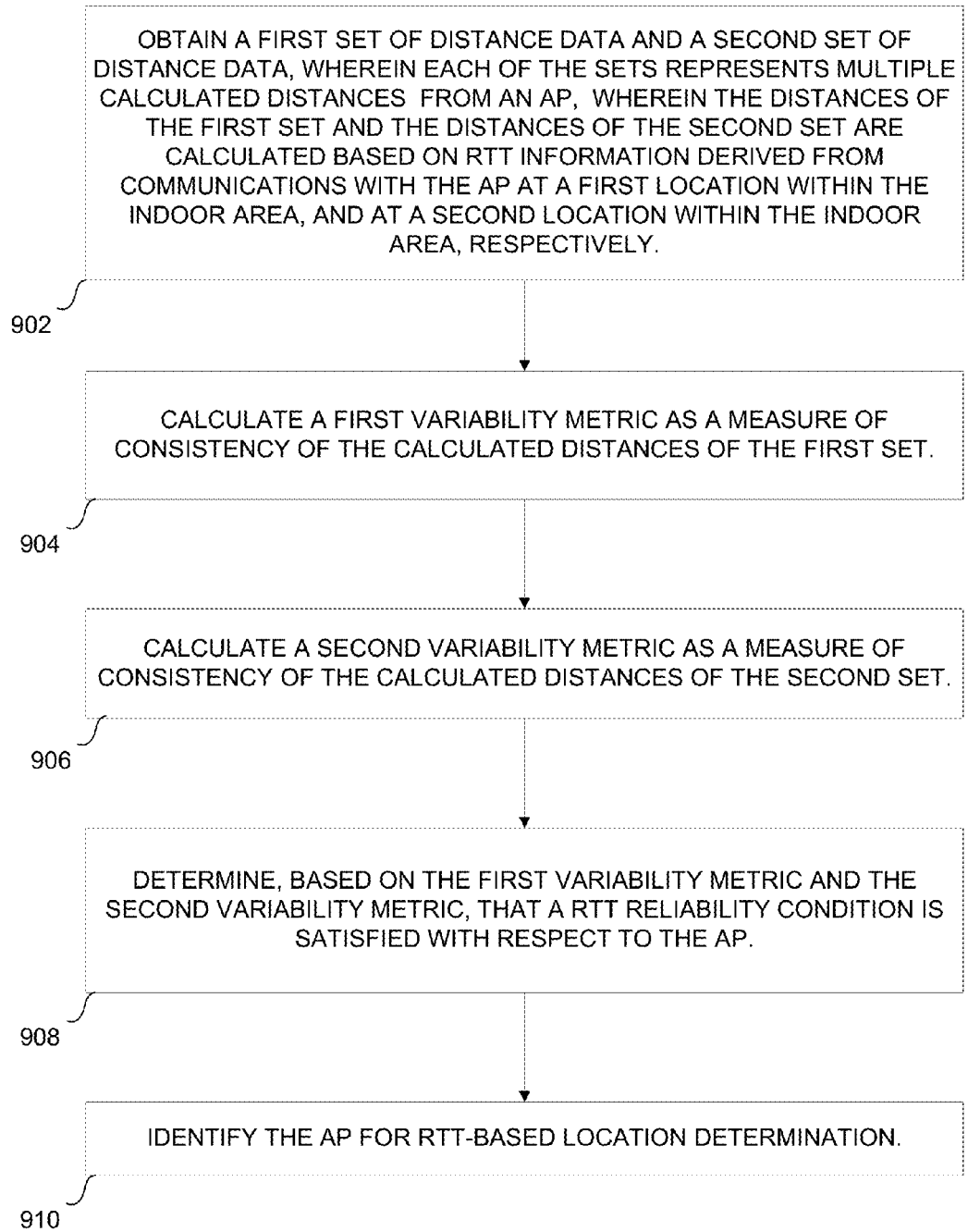
FIG. 9 is a flow diagram which depicts certain example operations involved in performing a consistency of error evaluation, as described herein.

FIG. 9 is a flow diagram depicting example operations described herein. At 902, the flow diagram describes obtaining a first set of distance data and a second set of distance data, wherein each set represents multiple calculated distances from an AP, wherein the distances of the first set and the distances of the second set are calculated based on RTT information derived from communications with the AP at a first location within the indoor area, and at a second location within the indoor area, respectively. At 904, the flow diagram describes calculating a first variability metric, the first variability metric quantifying a consistency of the calculated distances of the first set. At 906, the flow diagram describes calculating a second variability metric, the second variability metric quantifying a consistency of the calculated distances of the second set. At 908, the flow diagram describes determine that a RTT reliability condition is satisfied with respect to the AP, wherein determining that the RTT reliability condition is satisfied is based on the first variability metric and the second variability metric. At 910, the flow diagram describes identifying the AP for RTT-based location determination.

FIG. 10 is a flow diagram representing example operations described herein. At 1002, the flow diagram depicts obtaining a first set of distance data representing multiple calculated distances from a first AP in an indoor area, wherein the distances are calculated based on RTT information derived from communications with the first AP at multiple locations within the area. At 1004, the flow diagram describes obtaining a distance threshold for the area, wherein the distance threshold is based on dimensions of the area. At 1006, the flow diagram describes determining that a reliability condition is satisfied with respect to the first AP, wherein determining that the reliability condition is satisfied is based on the first set of distance data and the distance threshold. At 1008, the flow diagram describes providing a remote entity with information for identifying the first AP such that providing is in response to determining that the reliability condition is satisfied with respect to the first AP.

Figure 11:
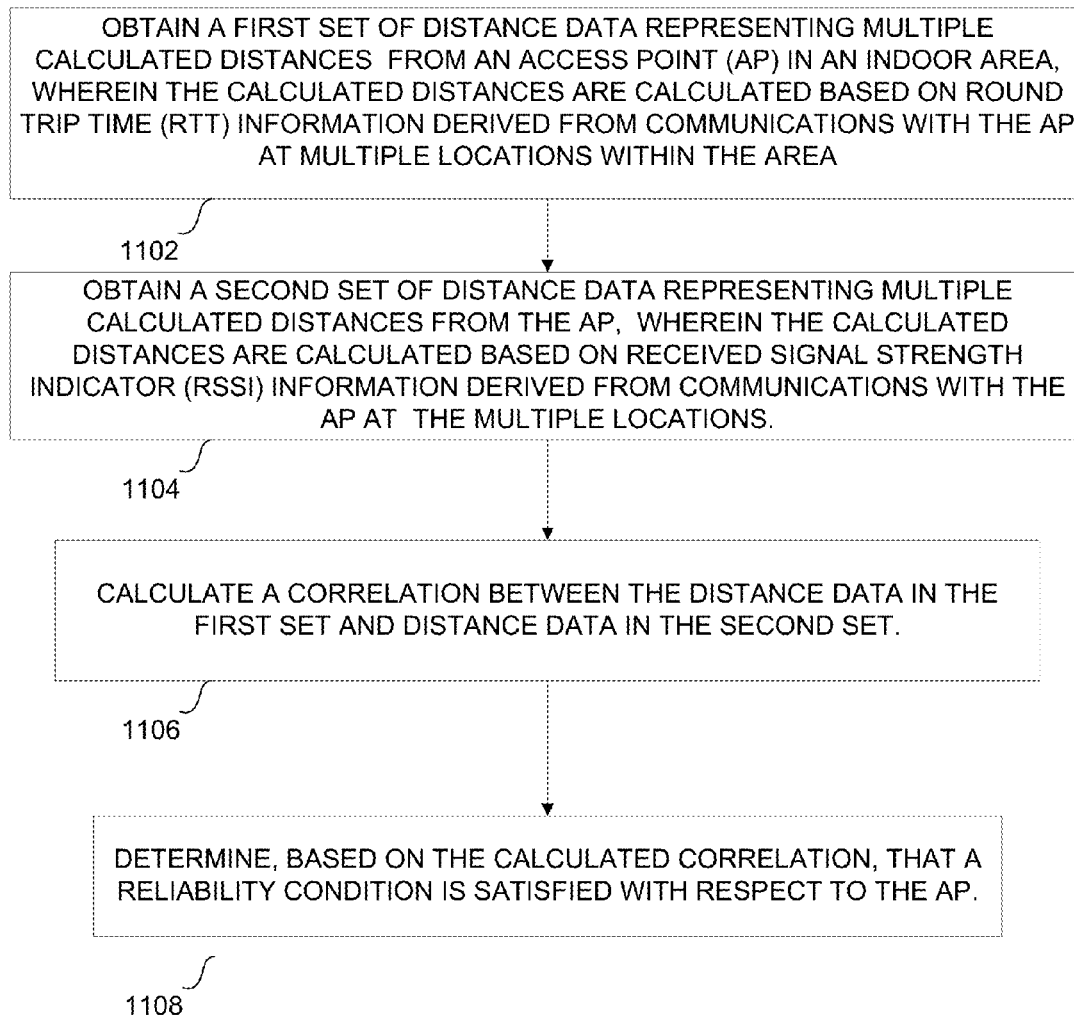
FIG. 11 is a flow diagram which depicts example operations associated with performing an RTT/RSSI correlation evaluation, as described herein.

FIG. 11 is a flow diagram showing example operations described herein. At 1102, the diagram describes obtaining a first set of distance data representing multiple calculated distances from a first AP in an indoor area, wherein the distances are calculated based on RTT information derived from communications with the first AP at multiple locations within the area. At 1104, the diagram describes obtaining a second set of distance data representing multiple calculated distances from the AP, wherein the calculated distances are calculated based on received signal strength indicator (RSSI) information derived from communications with the AP at the multiple locations. At 1106, the diagram describes calculating a correlation between the distance data in the first set and distance data in the second set. At 1108, the diagram describes determining, based on the calculated correlation, that a reliability condition is satisfied with respect to the AP.

In the aforementioned descriptions, specific details are given so as to enable a thorough understanding of certain of the various embodiments of the disclosed techniques, systems, methods, processes and the like. However, any such embodiments within the scope of this disclosure need not be characterized by these specific details. Also, well-known circuits, processes, algorithms, structures, and techniques have been shown without unnecessary detail in order to avoid obscuring the embodiments.

This description provides example embodiments only, and is not intended to limit the scope, applicability, or configuration of the invention. Rather, the preceding description of certain of the many embodiments of the invention will provide those skilled in the art with an enabling description which will facilitate implementation of the subject matter of this disclosure. Various changes may be made in the function and arrangement of elements without departing from the spirit and scope of the invention.

Also, some embodiments were described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof When implemented in software, firmware, middleware, or microcode, the program code or code segments to perform the associated tasks may be stored in a computer-readable medium such as a storage medium. Processors may perform the associated tasks.

Where the embodiments involve firmware and/or software implementation, certain functionality may be provided through instructions or code stored on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

What is claimed is:

1. A method for identifying access points (APs) that provide reliable signaling, the method comprising:
    obtaining a first set of distance data representing multiple calculated distances between a first access point (AP) and a mobile device in an indoor area, wherein the multiple calculated distances are calculated based on a round trip time (RTT) information derived from communications with the first AP at multiple locations of the mobile device within the indoor area;
    obtaining a distance threshold for the indoor area, wherein the distance threshold is based on dimensions of the indoor area;
    determining, based on a comparison of the first set of distance data and the distance threshold, that a reliability condition is satisfied with respect to the first AP; and
    in response to determining that the reliability condition is satisfied with respect to the first AP, identifying the first AP for a RTT-based location determination.

2. The method of claim 1, wherein the method is executed by a server, and wherein identifying the first AP for the RTT-based location determination includes transmitting an indication that the reliability condition is satisfied with respect to the first AP, wherein the indication is transmitted to the mobile device.

3. The method of claim 1, wherein the method is executed by the mobile device, and wherein the first AP is used by the mobile device for determining its position.

4. The method of claim 1, wherein determining that the reliability condition is satisfied includes determining that each of calculated distances represented by the first set of distance data is less than the distance threshold.

5. The method of claim 1, wherein determining that the reliability condition is satisfied includes:
    accessing a threshold percentage;
    calculating a percentage of the multiple calculated distances represented by the first set of distance data which exceed the distance threshold; and
    determining that the calculated percentage is less than the threshold percentage.

6. The method of claim 5, further comprising:
    obtaining a second set of distance data representing calculated distances from a second AP located in the indoor area, wherein the calculated distances from the second AP are calculated based on a RTT information derived from communications with the second AP at multiple locations within the indoor area;
    determining that the reliability condition is not satisfied with respect to the second AP, wherein determining that the reliability condition is not satisfied includes determining that one of the calculated distances represented by the second set of distance data is greater than the distance threshold.

7. The method of claim 6, further comprising:
    transmitting an indication that the reliability condition is not satisfied with respect to the second AP.

8. The method of claim 1, wherein the distance threshold is determined to represent a maximum horizontal line-of-sight signal path in the indoor area.

9. The method of claim 1, wherein obtaining the first set of distance data includes utilizing crowd sourcing to obtain information about the communications at the first location.

10. A method for identifying APs that provide reliable signaling, the method comprising:
    obtaining a first set of distance data and a second set of distance data, wherein each of the sets represents multiple calculated distances from an access point (AP), wherein the multiple calculated distances of the first set and the multiple calculated distances of the second set are calculated based on a round trip time (RTT) information derived from communications with the AP at a first location within the indoor area, and at a second location within the indoor area, respectively;
    calculating a first variability metric as a measure of consistency of the multiple calculated distances of the first set;
    calculating a second variability metric as a measure of consistency of the multiple calculated distances of the second set;

determining, based on the first variability metric and the second variability metric, that a RTT reliability condition is satisfied with respect to the AP; and identifying the AP for a RTT-based location determination.

11. The method of claim 10, wherein the communications at the first location and the communications at the second location include communications between the AP and multiple mobile devices.

12. An apparatus for identifying access points (APs) that provide reliable signaling, the apparatus comprising:
a processor configured to:
obtain a first set of distance data representing multiple calculated distances between a first access point (AP) and a mobile device in an indoor area, wherein the multiple calculated distances are calculated based on a round trip time (RTT) information derived from communications with the first AP at multiple locations of the mobile device within the indoor area;
obtain a distance threshold for the indoor area, wherein the distance threshold is based on dimensions of the indoor area;
determine, based on the first set of distance data and the distance threshold, that a reliability condition is satisfied with respect to the first AP; and
in response to determining that the reliability condition is satisfied with respect to the first AP, identifying the first AP for a RTT-based location determination; and
a memory coupled to the processor.

13. The apparatus of claim 12, wherein the apparatus is a server, and wherein identifying the first AP for the RTT-based location determination includes transmitting an indication that the reliability condition is satisfied with respect to the first AP, wherein the indication is transmitted to the mobile device.

14. The apparatus of claim 12, wherein the apparatus is the mobile device, and wherein the mobile device is configured to use the first AP for determining a position of the mobile device.

15. The apparatus of claim 12, wherein determining that the reliability condition is satisfied includes determining that each of calculated distance represented by the first set of distance data is less than the distance threshold.

16. The apparatus of claim 12, wherein determining that the reliability condition is satisfied includes:
accessing a threshold percentage;
calculating a percentage of the multiple calculated distances represented by the first set of distance data which exceed the distance threshold; and
determining that the calculated percentage is less than the threshold percentage.

17. The apparatus of claim 16, wherein the processor is further configured to:

obtain a second set of distance data representing calculated distances from a second AP located in the indoor area, wherein the calculated distances from the second AP are calculated based on a RTT information derived from communications with the second AP at multiple locations within the indoor area;
determine that the reliability condition is not satisfied with respect to the second AP, wherein determining that the reliability condition is not satisfied includes determining that one of the calculated distances represented by the second set of distance data is greater than the distance threshold.

18. The apparatus of claim 17, wherein the processor is further configured to:
transmit an indication that the reliability condition is not satisfied with respect to the second AP.

19. The apparatus of claim 12, wherein the distance threshold is determined to represent a maximum horizontal line-of-sight signal path in the indoor area.

20. An apparatus for identifying access points (APs) that provide reliable signaling, the apparatus comprising:
a processor configured to:
obtain a first set of distance data and a second set of distance data, wherein each of the sets represents multiple calculated distances from an access point (AP), wherein the multiple calculated distances of the first set and the multiple calculated distances of the second set are calculated based on a round trip time (RTT) information derived from communications with the AP at a first location within an indoor area, and at a second location within the indoor area, respectively;
calculate a first variability metric as a measure of consistency of the multiple calculated distances of the first set;
calculate a second variability metric as a measure of consistency of the multiple calculated distances of the second set;
determine, based on the first variability metric and the second variability metric, that a RTT reliability condition is satisfied with respect to the AP; and
identify the AP for a RTT-based location determination; and
a memory coupled to the processor.

21. The apparatus of claim 20, wherein the communications at the first location and the communications at the second location include communications between the AP and multiple mobile devices.

22. The apparatus of claim 21, wherein accessing the first set of distance data includes utilizing crowd sourcing to obtain information about the communications at the first location.

* * * * *